United States Patent [19]

Oosterkamp

[11] Patent Number: 5,130,082
[45] Date of Patent: Jul. 14, 1992

[54] LOW PRESSURE DROP GAS-LIQUID SEPARATOR

[75] Inventor: Willem J. Oosterkamp, Los Gatos, Calif.

[73] Assignee: General Electric Company, San Jose, Calif.

[21] Appl. No.: 633,749

[22] Filed: Dec. 20, 1990

[51] Int. Cl.$^5$ .............................................. G21C 15/16
[52] U.S. Cl. .................................. 376/371; 376/377
[58] Field of Search ..................... 376/370, 371, 377; 976/DIG. 22, DIG. 195

[56] References Cited

U.S. PATENT DOCUMENTS

| | | | |
|---|---|---|---|
| 3,339,631 | 9/1967 | McGurty et al. | 376/371 |
| 3,629,065 | 12/1971 | Knox | 376/371 |
| 3,902,876 | 9/1975 | Moen et al. | 376/371 |
| 4,322,233 | 3/1982 | Sisk | 376/371 |
| 4,912,733 | 3/1990 | Gluntz | 376/371 |

Primary Examiner—Brooks H. Hunt
Assistant Examiner—Frederick H. Voss
Attorney, Agent, or Firm—Robert R. Schroeder

[57] ABSTRACT

The present invention is directed to gas-liquid separators especially adapted for the separation of steam exiting the core of a nuclear boiling water reactor that utilizes natural circulation. Such separator has a barrel having a longitudinal axis and width, has an inlet and an outlet, and has a plurality of spaced-apart pickoff rings in fluid communication with annular flow discharge passages. The improved separator of the present invention comprises the pickoff rings having curvilinear shape to direct flow into the flow discharge passages. A twisted strip swirler is positioned along the axis of the barrel after the initial pickoff ring and does not extend the full width of the barrel. The width of the barrel increases at each succeeding pick-off ring from the barrel inlet to the barrel outlet. Advantageously, a low expansion angle exists between the rings and the top of the separator barrel.

20 Claims, 1 Drawing Sheet

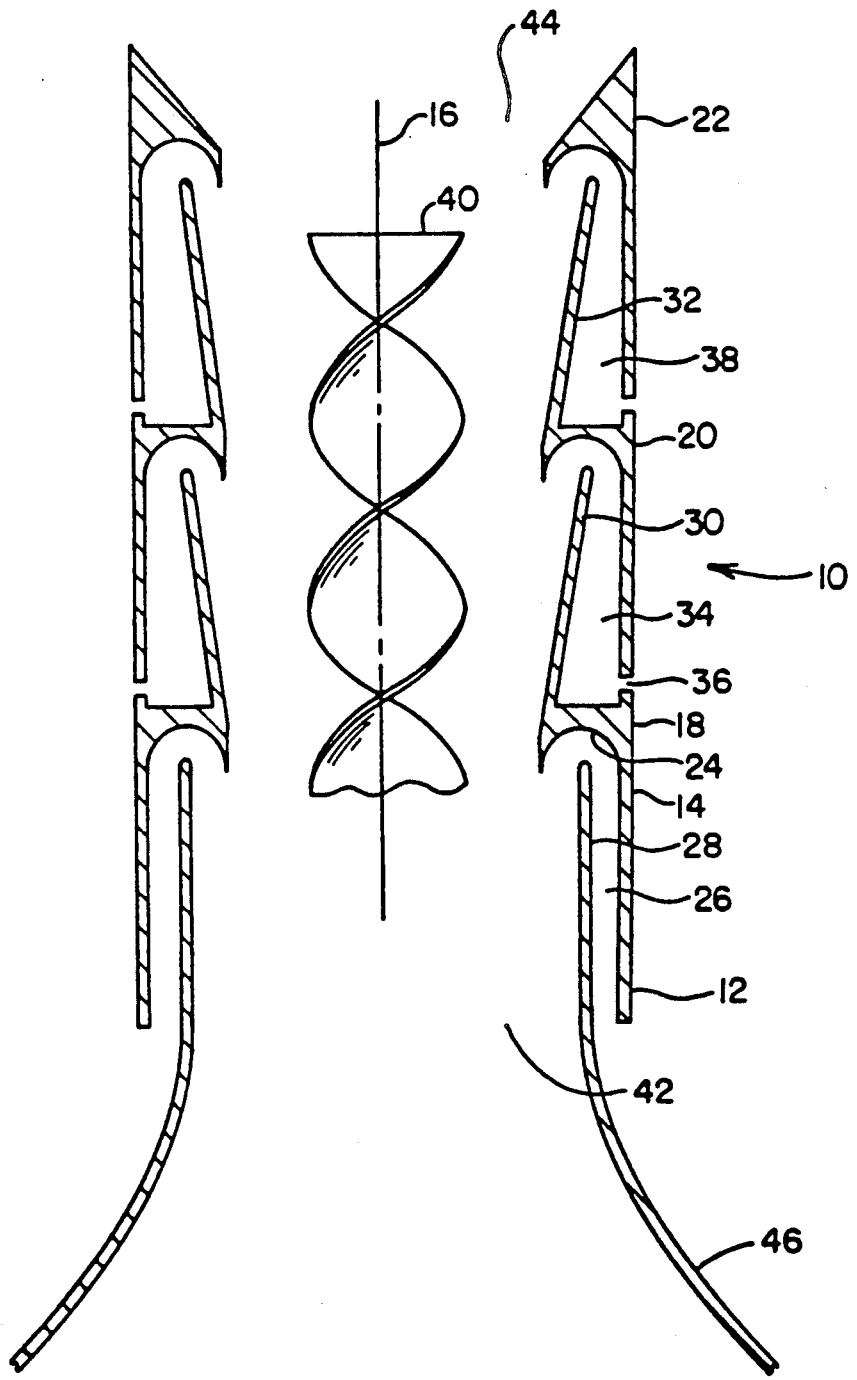

LOW PRESSURE DROP GAS-LIQUID SEPARATOR

BACKGROUND OF THE INVENTION

The present invention relates to nuclear boiling water reactors (BWRs) that utilize natural circulation and more particularly to improving the separation of steam in such reactor designs.

Existing large BWRs are of the forced-circulation type. In BWRs undergoing power generation operations, reactor coolant, initially in the form of sub-cooled liquid (e.g. water), is circulated by main coolant recirculation devices (e.g. jet pumps or mixed-flow motor-driven pumps) around a path a portion of which is comprised of the core lower plenum region (located at the bottommost section of the reactor), thence through the nuclear core and into a core upper plenum in communication with the core. Flow exiting the core upper plenum then passes through standpipes that lead to an assembly of steam separators. The reactor coolant exiting the nuclear core and passing into the core upper plenum is a two-phase mixture of steam and water, the proportion of which varies depending upon such factors as the power output from the fuel bundles, the amount of sub-cooling present in the coolant entering the fuel bundle, and the amount of flow through the bundles. This last factor depends on the power of the recirculation pumps and the hydrodynamic flow resistance presented by the fuel bundle geometry and wetted surfaces, and the amount of orificing representing restrictions to flow just prior to the coolant's entrance into the core fuel assembly.

Joining with the core effluent in the core upper plenum is the core "by-pass" flow, which is reactor coolant that has flowed from the core lower (entrance) plenum into the region external to the fuel assembly channels (but inside the core shroud), thence upwardly generally through the region occupied by cruciform-shaped control blades which stand in various degrees of insertion into the core, thence across the upper grid member (called the "top guide") which with its lattice-like configuration keeps the fuel assemblies in a regular array, and finally into the core upper plenum. This by-pass coolant stream at its discharge into the core upper plenum is comprised substantially of saturated liquid, with perhaps a small amount of steam. Within the core upper plenum, these two effluents—by-pass flow and fuel bundle exit flow—rapidly mix together and quickly lose identity from their origins.

Mechanical steam separation can be utilized to accomplish the separation of the stem from the steam/water mixture exiting the core. Some earlier BWR designs used free-surface steam separation where, just as in the household tea kettle, steam separates unaided from the free-surface, and saturated water remains in the bulk coolant, which in BWRs is recirculated back down the downcomer annulus. This type of steam separation is feasible so long as the steam-leaving velocity, i.e. the bulk average velocity of the steam taken across the available pathway flow area, is not large, i.e. is no greater than about 1.8 foot/second. If steam-leaving velocities exceed this value, there tends to be carried along with the steam an unacceptably high moisture content. The high moisture levels saturate the moisture-drying abilities of the steam dryer, thus resulting in an unacceptably high moisture content in the stem leaving the reactor and supplied to the turbine. When steam moisture contents are too high in the turbine steam flow, accelerated erosion can occur in the steam lines and on first-stage turbine blades and the efficiency of the turbine is reduced.

It is possible to obtain free-surface separation capabilities if the reactor pressure vessel (RPV) cross-sectional area is made sufficiently large. However, cost economies dictate that minimum diameter RPVs be used, so that mechanical steam separation has been developed to handle the high power output steam production levels of modern BWRs. In these latter designs, the steam bulk average velocity moving through the wet steam plenum region immediately downstream of the mechanical steam separators is about 5 feet/second.

The fuel assemblies grouped over the central region of the core tend to have higher exit steam qualities than do bundles located at the peripheral region of the core. It is desirable, nonetheless, that the flow rates and steam/water mixture proportions entering the steam separator standpipes be relatively uniform. To facilitate gaining more nearly uniform steam/water mixture for entry into the standpipes, the standpipe entrances are separated from the fuel assemblies by a distance of, for example, about 5 feet. Turbulent mixing occurring between the plumes leaving adjacent fuel assemblies, each with a different void content, is one mechanism acting to produce a more nearly uniform mixture which enters into the steam separator standpipes. More important to achieving flow mixture uniformity, however, is the hydrodynamic flow resistance represented by the standpipes, each with their end-mounted steam separators. Complete flow mixture uniformity entering the standpipes is at best difficult to achieve and, even with a five-foot separation between fuel assembly exits and standpipe entrances, it is not a design basis used for reactor performance evaluations.

The steam separator assembly consists of a domed or flat-heat base on top of which is welded an array of standpipes with a three-stage steam separator, for example, located at the top of each standpipe. One function of the standpipes is to provide a stand-off separation of the larger-diameter steam separators, which are generally arranged in a particularly tightly-compacted arrangement in which external diameters of adjacent separators are nearly touching with each other, so that separated liquid coolant discharged at the bottom of the separator has a more "open" flow path outwardly from the reactor longitudinal axis and out to the downcomer annulus region which lies at the inboard periphery to the RPV. A second purpose for the standpipes is a high-power-output natural-circulation reactor using mechanical steam separators is to provide juxtaposed regions which promote natural-circulation by means of a vertical region of two-phase (and, thus, low-density) coolant inside the standpipes which is juxtaposed against single-phase liquid coolant outside the standpipes in a so-called "downcomer region", in which region height provides a very significant part of the total natural circulation driving head for coolant flow circulation within the reactor.

The steam separator assembly rests on the top flange of the core shroud and forms the cover of the core discharge plenum ("core upper plenum") region. The seal between the separator assembly and core shroud flange is a metal-to-metal contact and does not require a gasket or other replacement sealing devices. The fixed axial flow type steam separators have no moving parts and are made of stainless steel, for example, to resist corrosion and erosion.

In each separator, the steam/water mixture rising through the standpipes (the "standpipe region") impinges upon vanes which give the mixture a spin, thus enabling a vortex wherein the centrifugal forces separate the water from the steam in each of three stages. Steam leaves the separator at the top of this assembly and passes into the wet steam plenum below the dryer. The separated water exits from the lower end of each stage of the separator and enters the pool (the "downcomer region") that surrounds the standpipes to join the downcomer flow. The steam exiting form all separators either may be in the same horizontal plane, or the separators may be arranged in a slightly crowned fashion at the center to compensate for the crowned water gradient of the pool surrounding the standpipes. See U.S. Pat. No. 3,902,876 and Wolf, et al., "Advances in Steam-Water Separators for Boiling Water Reactors", ASME Paper No. 73-WA/Pwr-4, Nov. 1973.

The steam separator assembly may be bolted to the core shroud flange by long hold-down bolts, or the separator together with the dryer assembly may be held down onto the core shroud flange by contact from the reactor head when the latter is assembled to the reactor vessel. The nominal volumetric envelope of the steam separator assembly is defined by the horizontal plane of its lower flange that contacts the core shroud flange, its cylindrical sides that provide part of the five-foot standoff from the fuel assembly exits, the circumscribed diameter of the outermost row of standpipes, the circumscribed diameter of the outermost row of steam separators, and the generally horizontal plane of the exits to the steam separators.

The core upper plenum region in a BWR currently under design known as the "simplified boiling water reactor" (SBWR) is substantially devoid of other mechanical devices, pipes, or structures; whereas the core upper plenum of a BWR/6 and "advanced boiling water reactor" (ABWR) reactor design generally contains spargers and nozzles for core sprays, and distribution headers for core flooders, respectively. In both reactor types, these spargers/headers are located at the outer periphery of the core upper plenum, mounted below the core shroud flange so that the sparger/header is clear of the refueling removal path of peripheral fuel assemblies and, thus, do not become removed during core refueling operations.

With specific reference to a natural-circulation SBWR, it will be observed that there are no recirculation pumps to aid in coolant recirculation. Steam generation in the core produces a mixture of steam and water which, because of steam voids, is less dense than saturated or sub-cooled water. Thus, the boiling action in the core results in buoyancy forces which induce core coolant to rise upwardly, to be continuously replaced by non-voided coolant arriving from beneath the core in the core lower plenum region. As the coolant leaves the core, it rises through the core upper plenum region, then through the standpipes region, and finally into the steam separators. This voided mixture inside these standpipes continues to be less dense than non-voided coolant external tot he standpipes, resulting in the development of additional buoyancy force to further drive the coolant circulation. That this process is quite effective in promoting coolant recirculation can be noted from reported tests made in forced-circulation power reactors where the coolant circulation pumps are shut off. Even with their relatively short steam separator standpipes, reactor power levels of 25% and coolant flow rates of 35% of rated flow, are readily and safely maintainable.

The SBWR reactor is but modestly different form the forced-circulation BWR, with the most prominent differences being that the standpipes region is to be considerably longer in the SBWR (to develop a higher differential head), the core overall height may be somewhat shorter (for example, being 8 or 9 feet active fuel length versus 12.5 feet active fuel length in recent forced-circulation reactors), and the core power density will be somewhat lower. The severity of orificing—a means to promote hydrodynamic stability—at the entrance to the BWR fuel bundles may be lessened. The fuel bundle may have a larger diameter fuel rod in, for example, a $6 \times 6$ rod array, whereas the rod array for a forced-circulation reactor often is an $8 \times 8$ rod array. The design flow rates per fuel bundle, and the flow rates per steam separator, will be somewhat reduced in the SBWR design. Fuel exit steam quality will be approximately the same between the two designs. In the SBWR reactor design, no spargers or discharge headers are installed in the core upper plenum, while in the ABWR reactor, spargers or discharge headers are installed in the upper core plenum.

In some versions of SBWR reactors under study, the standpipes are very long while the core upper plenum is short. In other versions, the converse is true. The present invention is applicable equally in either version and to forced circulation BWRs.

The steam output from the nuclear boiler is coupled to a turbine generator which, in turn, is coupled electrically to the grid. A nuclear boiler pressure regulation control system is installed, the action of which changes the position of turbine steam control valves in such a way so as to maintain constant the nuclear boiler pressure as measured int he reactor steam dome.

Particular care must be taken to reduce all irreversible pressure drops in the design of natural circulation BWRs. This is especially necessary in the two-phase region where most of the resistance occurs. The steam separators in an SBWR are a prime candidate for improvement as they cause $\frac{1}{3}$ to $\frac{1}{2}$ of the irreversible losses in the natural circulation loop. The optimum design of a steam separator in a natural circulation reactor is different from that of a forced circulation reactor, as pressure drops should be minimized even at the cost of high carryover and carryunder values. Free surface separation removes all resistance and is marginally possible for the SBWR.

Preseparation of flow can be enhanced by having a transition piece between the standpipe and the core upper plenum. The flow regime in the standpipes is slug flow and approaches annular mist flow. Both flow types are already somewhat separated. Care must be taken in the design of steam separators that what is already separated is not remixed. There are several points in a steam separation design as set forth in U.S. Pat. No. 3,902,876, cited above, where mixing occurs. There is an area change between the standpipes and the separating barrels. The inlet swirler furthermore has a fairly large hub and the pick-off rings introduce eddys which cause not only irreversible pressure losses, but also mixing between the pre-separated phases.

BROAD STATEMENT OF THE INVENTION

The present invention is directed to gas-liquid separators especially adapted for the separation of steam exiting the core of a nuclear boiling water reactor that utilizes natural circulation. Such separator has a barrel having a longitudinal axis and width, has an inlet and an outlet, and has a plurality of spaced-apart pickoff rings in fluid communication with annular flow discharge passages. The improved separator of the present invention comprises the pickoff rings having curvilinear shape to direct flow into the flow discharge passages. A twisted strip swirler is positioned along the axis of the barrel after the initial pickoff ring and does not extend the full width of the barrel. Advantageously, a low expansion angle exits between the rings and the top of the separator barrel.

Advantages of the present invention include a separator design that minimizes irreversible pressure drops. Another advantage is a separator design that is readily implemented within the design philosophy of natural circulation BWRs. Yet another advantage is a separator design that should prove effective in the separation of steam from liquid water. These and other advantages will be readily apparent to those skilled in the art based upon the disclosure contained herein.

BRIEF DESCRIPTION OF THE DRAWING

The drawing is an elevation view, partly in longitudinal cross-section, of a separator according to the invention. The drawing will be described in detail in connection with the description below.

DETAILED DESCRIPTION OF THE INVENTION

Barrel separator 10 is representative of a plurality of separators bundled for utilization for steam/water separation in a natural circulation BWR. The diameter of barrel separator 10 for use in an AS-2B boiling water reactor is about 200 mm and the barrels are on a 300 mm triangular pitch so as to optimize the up flow and cross flow areas for the lower recirculation flow in the noted SBWR reactor. Separator 10 is seen mounted atop standpipe 12 which conveys the two-phase mixture for separation of the steam from liquid water exiting the core upper plenum of the BWR. Barrel separator 10 is formed form outer skirt 14 which desirably is tubular in shape. Separator 10 has axis 16.

The design of separator 10 in the drawing is seen to contain pickoff rings 18, 20, and 22. It will be appreciated that a greater or lesser number of pickoff rings could be used as is necessary, desirable, or convenient. Pickoff ring 18 will be described in detail with the understanding that the same description applies to pick-off rings 20 and 22. Pickoff ring 18 has curvilinear surface 24 that provides flow communication from within separator 10 to annular water discharge passage 26. Passage 26 is formed from outer skirt 14 and vane 28. Eddys are avoided by virtue of the curvilinear, preferably cylindrical, profile 24 of pickoff ring 18. The resistance for the downward flow through passage 26 can be regulated by the clearance between outer skirt 14 and vane 28, and the water level outside of this skirt within the BWR. The pickoff rings themselves will work as separators, as the steam will veer more to the center of separator 10 and liquid water will continue its path until curvilinear surface 24 of pickoff ring 18 is encountered. The amount of separation depends quite significantly on the ratio of the resistance for downward flow and upward flow through the remainder of separator 10.

Vanes 30 and 32 exhibit a low expansion angle, desirably about 3°-5°, in order to minimize the expansion losses, as further amplified in U.S. Pat. No. 3,902,876. Water flowing through passage 34, for example, flows outside of separator 10 through aperture 36. Similar apertures are provided in discharge passage 38.

Disposed along axis 16 is twisted strip swirler 40. Attachment of swirler 40 to the body of separator 10 is not shown in the drawing, but is to be provided in conventional fashion. It will be noted that swirler 40 commences after pickoff ring 18, the first pickoff ring encountered as the mixture passes from inlet 42 to outlet 44. Preferably, the width of swirler 40 is about 80% of the diameter of the separator 10. The length of strip swirler 40 can be determined experimentally by those skilled in the art, as can the pitch that increases montonically from zero at the lower end to a maximum value at its upper end. This same comment applies to the spacing between the pickoff rings. The use of the swirler that does not extend over the full width of separator 10 will reduce the pressure loss further as the water on the outside of the swirler will not directly be set into rotation. Rotation only occurs indirectly by the shear of the fluid that passes therethrough. The smooth twisted nature of swirler 40 further reduces irreversible pressure losses as the flow area is maximized. The positioning of the swirler above the first pickoff ring reduces further the irreversible pressure losses significantly, as the mass flow to be processed by the swirler is reduced by the amount of water diverted by the initial pickoff ring, i.e. pickoff ring 18 depicted in the drawing. Finally, transition piece 42 having an opening angle of between about 20° and 60° can be used between the core upper plenum and standpipe 12 in order to ensure that the boundary layer does not separate from the wall.

Thus, it will be appreciated that the design of the gas-liquid separator of the present invention is consistent in providing low pressure drop separation of steam/water mixtures in particular, and gas/liquids in general. Since certain modification can be made in accordance with the precepts of the present invention, the description herein is illustrative rather than limitative.

I claim:

1. In a gas/liquid separator of a separator barrel having a longitudinal axis and width, having an inlet and outlet, and having a plurality of spaced-apart pickoff rings in fluid communication with annular flow discharge passages, the improvement which comprises a swirler being positioned along the axis of said barrel after the initial pickoff ring.

2. The separator of claim 1 wherein said swirler does not extend the full width of said barrel.

3. The separator of claim 2 wherein said swirler extends about 80% of the width of said barrel.

4. The separator of claim 1 which has three pickoff rings.

5. The separator of claim 1 wherein said vanes exhibit an expansion angle between each succeeding pickoff ring.

6. The separator of claim 5 wherein said vane expansion angle ranges from between about 3° and 5°.

7. The separator of claim 1 wherein said barrel is tubular in shape.

8. The separator of claim 1 wherein said pickoff rings have a curvilinear shape to direct flow into said flow discharge passages.

9. The separator of claim 8 wherein said swirler does not extend the full width of said barrel, and said vanes exhibit an expansion angle between each succeeding pickoff ring.

10. The separator of claim 1 wherein said barrel inlet is connected to a transition piece having an opening of between about 20° and 60°.

11. In a method for separating gas form liquid in a gas/liquid separator of a separator barrel having a longitudinal axis and a width, having an inlet and an outlet, having a plurality of spaced-apart pick-off rings in fluid communication with annular flow discharge passages, the improvement which comprises:

passing said gas/liquid from said barrel inlet to said barrel outlet wherein;

a twisted strip swirler is positioned along the axis of said barrel after the initial pickoff ring.

12. The separator of claim 11 wherein said swirler does not extend the full width of said barrel.

13. The separator of claim 12 wherein said swirler extends about 80% of the width of said barrel.

14. The separator of claim 11 which has three pickoff rings.

15. The separator of claim 11 wherein said vanes exhibit an expansion angle between each succeeding pickoff ring.

16. The separator of claim 1 wherein said vane expansion angle ranges form between about 3° and 5°.

17. The separator of claim 11 wherein said barrel is tubular in shape.

18. The separator of claim 11 wherein said pickoff rings have a curvilinear shape to direct flow into said flow discharge passages.

19. The separator of claim 18 wherein said swirler does not extend the full width of said barrel, and said vanes exhibit an expansion angle between each succeeding pickoff ring.

20. The separator of claim 11 wherein said barrel inlet is connected to a transition piece having an opening of between about 20° and 60°.

* * * * *